(12) United States Patent  (10) Patent No.: US 8,206,478 B2
Nordlund et al.  (45) Date of Patent: Jun. 26, 2012

(54) PORTABLE AND MODULAR SEPARATOR/COLLECTOR DEVICE

(75) Inventors: Sebastian Nordlund, Solna (SE); Niklas Linderholm, Rönninge (SE)

(73) Assignee: Pratt & Whitney Line Maintenance Services, Inc., East Hartford, CT (US)

( * ) Notice: Subject to any disclaimer, the term of this patent is extended or adjusted under 35 U.S.C. 154(b) by 319 days.

(21) Appl. No.: 12/758,309

(22) Filed: Apr. 12, 2010

(65) Prior Publication Data
US 2011/0247501 A1  Oct. 13, 2011

(51) Int. Cl.
*B01D 45/08* (2006.01)
(52) U.S. Cl. ............... 55/462; 55/463; 55/464; 55/465; 55/490; 55/495; 55/497; 55/527; 55/528; 55/486; 55/385.1; 55/306
(58) Field of Classification Search .......... 55/462–465, 55/490, 492, 495, 497, 527, 528, 486, 487, 55/385.1, 306; 96/187; 29/428; 210/171, 210/258, 266, 241
See application file for complete search history.

(56) References Cited

U.S. PATENT DOCUMENTS

| | | | |
|---|---|---|---|
| 1,890,156 A | 6/1930 | Konig | |
| 1,834,534 A | 12/1931 | Richards et al. | |
| 1,926,924 A | 9/1933 | Sylvan | |
| 2,760,597 A | 8/1956 | Brixius | |
| 2,878,892 A | 3/1959 | Field | |
| 3,527,030 A | 9/1970 | Hungate | |
| 3,564,820 A | 2/1971 | Nelson | |
| 3,616,623 A | 11/1971 | Reid | |
| 3,766,719 A | 10/1973 | McAnally, III | |
| 3,938,972 A | 2/1976 | Sugimura | |
| 4,059,123 A | 11/1977 | Bartos et al. | |
| 4,065,322 A | 12/1977 | Langford | |
| 4,158,449 A | 6/1979 | Sun et al. | |
| 4,196,020 A | 4/1980 | Hornak et al. | |
| 4,225,188 A | 9/1980 | McGuire et al. | |
| 4,234,323 A | 11/1980 | Maher | |
| 4,300,918 A | 11/1981 | Cary | |
| 4,462,192 A | 7/1984 | Fisher | |
| 4,530,707 A | 7/1985 | Ovard | |
| 4,543,108 A | 9/1985 | Wurz | |
| 4,557,740 A | 12/1985 | Smith | |
| 4,713,120 A | 12/1987 | Hodgens, II et al. | |
| H535 H | 10/1988 | Sam et al. | |
| 4,802,901 A | 2/1989 | Wurz et al. | |
| 4,834,912 A | 5/1989 | Hodgens, II et al. | |
| 4,975,101 A | 12/1990 | Swanborn | |
| 5,011,540 A | 4/1991 | McDermott | |
| 5,018,355 A | 5/1991 | Foster | |
| 5,137,555 A | 8/1992 | Fewel, Jr. | |
| 5,268,011 A | 12/1993 | Wurz | |

(Continued)

FOREIGN PATENT DOCUMENTS
DE  2701823 A1  8/1977
(Continued)

*Primary Examiner* — Jason M Greene
*Assistant Examiner* — Dung H Bui
(74) *Attorney, Agent, or Firm* — Kinney & Lange, P.A.

(57) ABSTRACT

The disclosure relates to a modular waste liquid separator and collector device, comprising component modules. A first module comprises a support structure, a second module comprises a droplet separator connectable to said support structure, and a third module comprises a waste liquid collector. The component modules are individually portable, and are assembled at the point of use.

20 Claims, 2 Drawing Sheets

U.S. PATENT DOCUMENTS

| | | | |
|---|---|---|---|
| 5,269,823 A | 12/1993 | Wurz | |
| 5,318,254 A | 6/1994 | Shaw et al. | |
| 5,464,459 A | 11/1995 | VanBuskirk et al. | |
| 5,725,611 A | 3/1998 | Wright et al. | |
| 5,899,217 A | 5/1999 | Testman, Jr. | |
| 5,972,062 A | 10/1999 | Zimmermann | |
| 6,017,377 A | 1/2000 | Brown et al. | |
| 6,080,225 A | 6/2000 | Forster | |
| 6,310,022 B1 | 10/2001 | Amiran | |
| 6,470,668 B2 | 10/2002 | Payling et al. | |
| 6,478,033 B1 | 11/2002 | Foster | |
| 6,484,508 B2 | 11/2002 | Rocklin et al. | |
| 6,503,334 B2 | 1/2003 | Ruiz et al. | |
| 6,675,437 B1 | 1/2004 | York | |
| 6,964,669 B1 | 11/2005 | Knapp et al. | |
| 7,018,965 B2 | 3/2006 | Yan et al. | |
| 7,065,955 B2 | 6/2006 | Reback et al. | |
| 7,150,431 B2 | 12/2006 | Dennis | |
| 7,185,663 B2 | 3/2007 | Koch et al. | |
| 7,198,052 B2 | 4/2007 | Watt | |
| 7,297,260 B2 | 11/2007 | Hjerpe et al. | |
| 2002/0001255 A1 | 1/2002 | Flood et al. | |
| 2003/0209256 A1 | 11/2003 | Tadayon | |
| 2005/0199271 A1 | 9/2005 | Watt | |
| 2006/0060218 A1 | 3/2006 | Lakdawala et al. | |
| 2006/0060233 A1 | 3/2006 | Lakdawala et al. | |
| 2006/0081521 A1 | 4/2006 | Hjerpe et al. | |
| 2006/0219269 A1 | 10/2006 | Rice et al. | |
| 2006/0243308 A1 | 11/2006 | Asplund et al. | |
| 2007/0000528 A1 | 1/2007 | Asplund et al. | |
| 2007/0048127 A1 | 3/2007 | O'Neill et al. | |
| 2007/0059159 A1 | 3/2007 | Hjerpe | |
| 2008/0040872 A1 | 2/2008 | Hjerpe | |
| 2008/0149141 A1 | 6/2008 | Sales | |
| 2008/0178909 A1 | 7/2008 | Alvestig et al. | |
| 2008/0216873 A1 | 9/2008 | Hjerpe et al. | |
| 2009/0050183 A1 | 2/2009 | Rice et al. | |
| 2009/0159517 A1* | 6/2009 | Rice et al. | 210/171 |
| 2010/0242994 A1* | 9/2010 | Amcoff et al. | 134/10 |
| 2011/0108062 A1* | 5/2011 | Stone et al. | 134/10 |

FOREIGN PATENT DOCUMENTS

| | | |
|---|---|---|
| DE | G-9420362 | 3/1995 |
| EP | 0262097 A2 | 3/1988 |
| EP | 0628477 A1 | 12/1994 |
| EP | 1205640 A2 | 5/2002 |
| GB | 2074048 A | 10/1981 |
| KR | 10-1998-0017193 | 6/1998 |
| SU | 1755965 A1 | 8/1992 |
| WO | WO 96/40453 A1 | 12/1996 |

* cited by examiner

PORTABLE AND MODULAR SEPARATOR/COLLECTOR DEVICE

TECHNICAL FIELD

The present disclosure relates to aircraft engine washing, and in particular to devices usable for collecting waste water from washing.

BACKGROUND

Over the last decade the assignee of the present application, Gas Turbine Efficiency Sweden AB, has developed proprietary technology relating to aircraft turbine engine washing. This technology comprises applying pressurized water or washing fluid to the aircraft engines at the air inlet end and collecting the waste fluid at the exhaust outlet end, and a number of devices and methods have been claimed in several patents and patent applications.

Nevertheless, there is still room for further development in this field. In particular the accessibility of aircraft engines varies substantially between aircraft types and models. Thus, for rear engines that are mounted centrally on the aircraft it is difficult to gain appropriate access in order to attach and/or position the washing equipment using the current state of the art technology. In particular, rear engines can be located as high up as at about 30-40 feet above ground, which makes it difficult to use standard lifting means available at the airports. One would need to have access to a crane or similar heavy duty machinery in order to lift the apparatus to this height.

SUMMARY

Therefore, in order to overcome the problems of accessibility the inventors have devised a portable and modular separator/collector apparatus for collecting waste liquid during a washing operation of a rear mounted turbo jet engine.

The modular waste liquid separator and collector device according to the disclosure comprises as individual modules a support structure, a droplet separator connectable to said support structure, and a waste liquid chute device, wherein said component modules are individually portable.

An advantage of having a modular and portable device is that it can be handled manually, i.e. operators can hand carry the components to the place of use, and assemble it on the spot. This means that it can be used in places where it is difficult or even impossible to physically locate a large apparatus, which normally requires powerful lifting means such as fork lifts, hydraulic manipulation arms etc. for positioning the apparatus.

With the modular device according to the disclosure each module can easily be moved to the place of use by the operators, and assembled.

In another aspect of the disclosure there is provided a method of providing a waste liquid separator and collector device, comprising providing a support structure module, providing a droplet separator module connectable to said support structure module, providing a waste liquid collector module, locating said modules individually at a place of use, and assembling said modules to an operative unit.

Further scope of applicability of the present disclosure will become apparent from the detailed description given hereinafter and the accompanying drawings which are given by way of illustration only, and are thus not to be considered limiting on the present invention.

DETAILED DESCRIPTION

Figure 1:
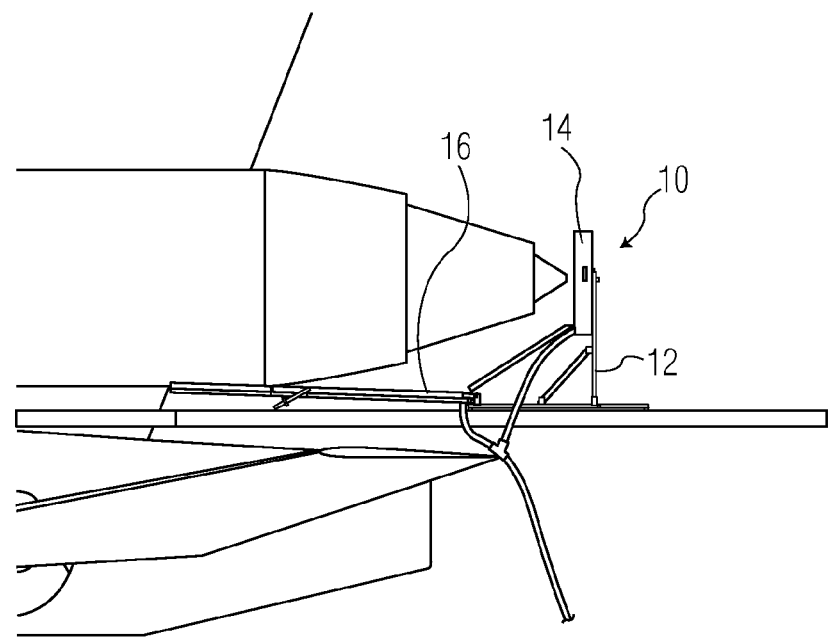
FIG. 1 shows an exemplary assembled device according to the disclosure ready for use on a work platform at the rear engine of an aircraft.

FIG. 1 shows a modular device according to one example of the disclosure in a mounted state and in position for use. In the figure the device is located on a work platform specially designed for enabling maintenance work to be performed on a rear mounted engine of a turbo jet powered aircraft at a high elevation, for example, of around 30-40 feet above ground.

The modular device according to the disclosure, indicated at 10 in FIG. 1, generally comprises a foldable support structure 12, a droplet separator 14 attachable to the support structure 12 so as to be carried on the support structure 12, and a waste liquid chute device 16 (also referred to as a drip pan), which may also be foldable. The individual components are sufficiently light-weight that they can easily be carried, such as by two persons up the stairs (or in a lift) to the work platform, where the components are assembled to a functional separator/collector and put into use.

The device 10 is used in a washing operation performed on the engine, the washing involves attaching a nozzle manifold to the air inlet end (not shown) of the engine, and applying high pressure water to the interior structure of the engine. This process will efficiently remove fouling substances and objects from the fans and walls in the interior of the engine. During this process the engine will normally be cranked, i.e. it will be driven by means of pressurized air at various possible speeds of rotation.

The waste liquid, i.e. water in the form of minute liquid droplets having passed through the engine including entrained particles and fouling material of various kinds, will hit the separator 14 in the device 10 according to the disclosure. According to use of one exemplary separator 14, the droplets will coalesce and trickle downwards, under the influence of gravity. Eventually the water falls onto the drip pan 16. The collected liquid can suitably be conveyed by appropriate tubing (not shown) down to a tank located on the ground.

Now the individual components of the modular device according to the disclosure will be described in more detail.

Figure 2:
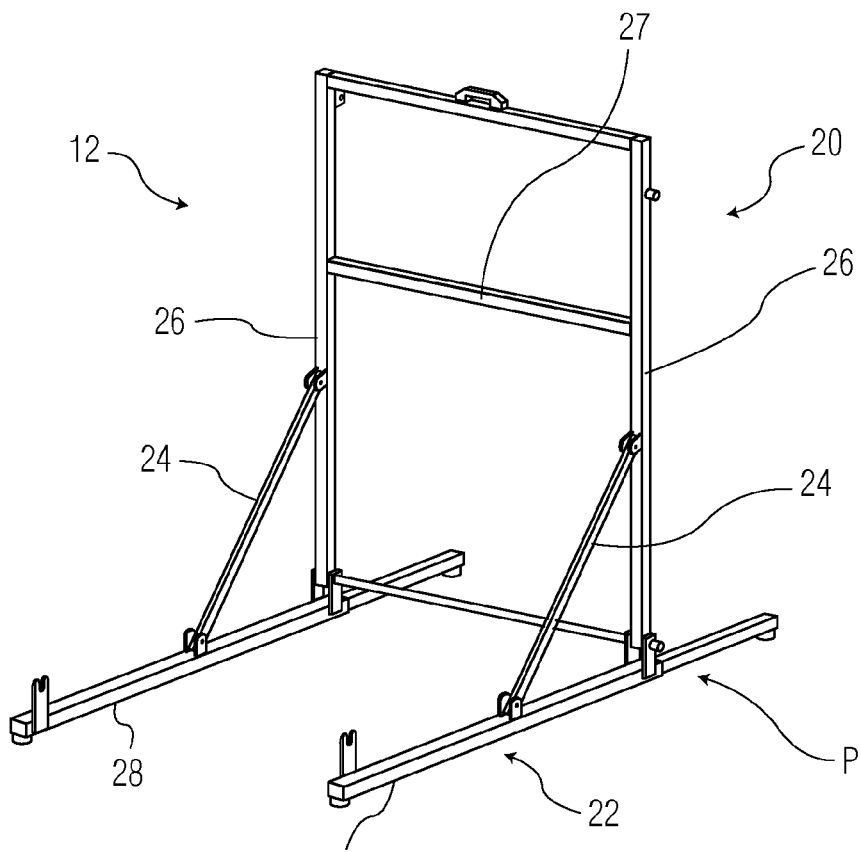
FIG. 2 shows an exemplary foldable frame.

Referring to FIG. 2 an exemplary embodiment of a support structure 12 is disclosed.

This embodiment comprises a separate frame 20 and a foot structure 22. In one embodiment the frame 20 and the foot structure 22 are rigidly connectable to each other so as to form a combination wherein the frame has an upright orientation and the foot structure is horizontally oriented.

There may also be provided a locking and stabilizing device 24 for locking and stabilizing the foot 22 and the frame 20 in a first position in which they are in a generally perpendicular orientation with respect to each other. In the embodiment shown in FIG. 2 this locking and stabilizing device comprises diagonal braces 24 connecting the frame 20 and the foot structure 22. The braces 24 may be pivotally connected at one end, either to a frame part 20 or to a foot part 22, and comprises a locking element at the other end, such that the braces will secure the perpendicular orientation of the frame 20 and foot 22 with respect to each other.

Alternatively, the braces 24 can be separate members that are connected by locking element at both ends to the frame 20 and foot 22, in a diagonal orientation.

In another embodiment the braces 24 are pivotally attached at one end to one of the frame 20 and the foot 22 structure, and provided so as to slide with its other end in a groove in the other of the frame 20 and the foot 22 structure. A suitable locking element is provide to fix the sliding end in a locked position.

In the shown embodiment the frame 20 is essentially rectangular, having two side bars 26 and at least one cross-bar 27 connecting the side bars 26. The foot structure 22 comprises two foot bars 28 pivotally coupled at a position P between the ends of the respective foot bar 28, to one end of each of the side bars 26.

Suitably the frame 20 and the foot structure 22 are made of metal bars of steel or possibly aluminium. However, they could equally well be manufactured from sheet metal suitably pressed to provide reinforcement profiles in the sheet or other suitable materials. The foot structure 22 could thereby comprise a flat structure, suitably reinforced for stability, instead of comprising two distinct "feet" 28, as shown in FIG. 2.

Any other design of the support structure is of course equally possible as long as it meets the requirement of being capable of carrying the separator.

For connecting the separator (to be described below) to the frame 20 of the support 12 there are suitable coupling means provided. Such means can be of any design as long as they maintain the separator in its position on the frame in a secure manner.

A simple coupling comprises hook members on the frame and mating recesses in the separator. Other simple means for fastening could be elastic straps attached on one part and secured to the other on a hook.

A skilled person would be able to design numerous variations of attachment means.

Figure 3:
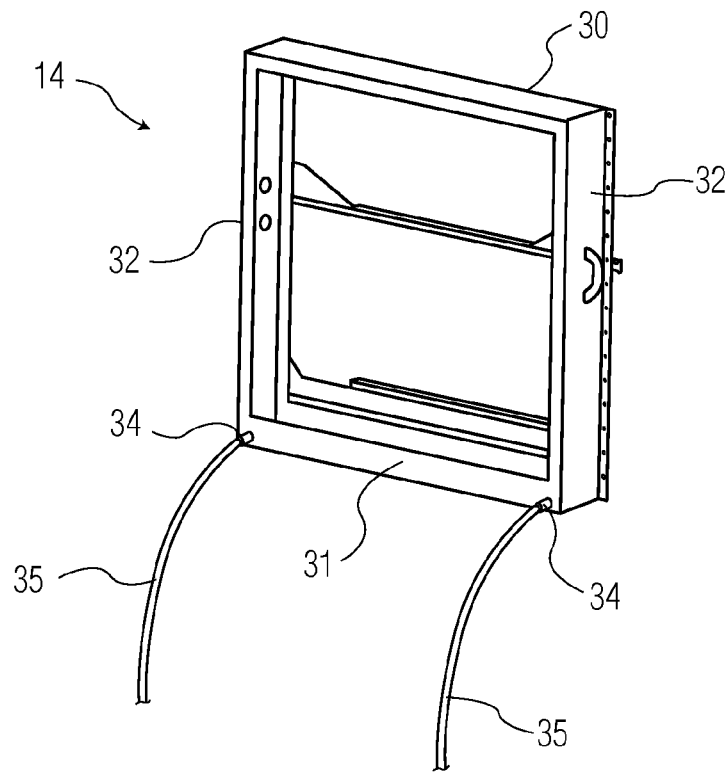
FIG. 3 shows an exemplary droplet separator.

FIG. 3 discloses an example of a droplet separator 14 usable in the present disclosure.

Droplet separators are known per se. However, in an exemplary embodiment a droplet separator 14 comprises a frame having upper and lower frame segments 30, 31 and side segments 32 connecting said upper and lower segments. There are droplet separating elements provided in the frame. These elements are capable of deflecting the flow of a mixture of gas and liquid emanating from the exhaust outlet of the engine, whereby the liquid loses momentum, and coalesces on the elements. The coalesced liquid in the form of larger droplets is conveyed downwards by gravity, and are collected in the lower frame segment 31. The lower frame segment 31 comprises a drain 34 for draining liquid that has collected in the lower frame segment 31. There is also suitably provided tubing 35 coupled to the drain 34 for conveying the waste liquid to a waste liquid reservoir, located on the ground. Other suitable droplet separators or other devices for removing the liquid from the air flow may also be used.

Figure 4:
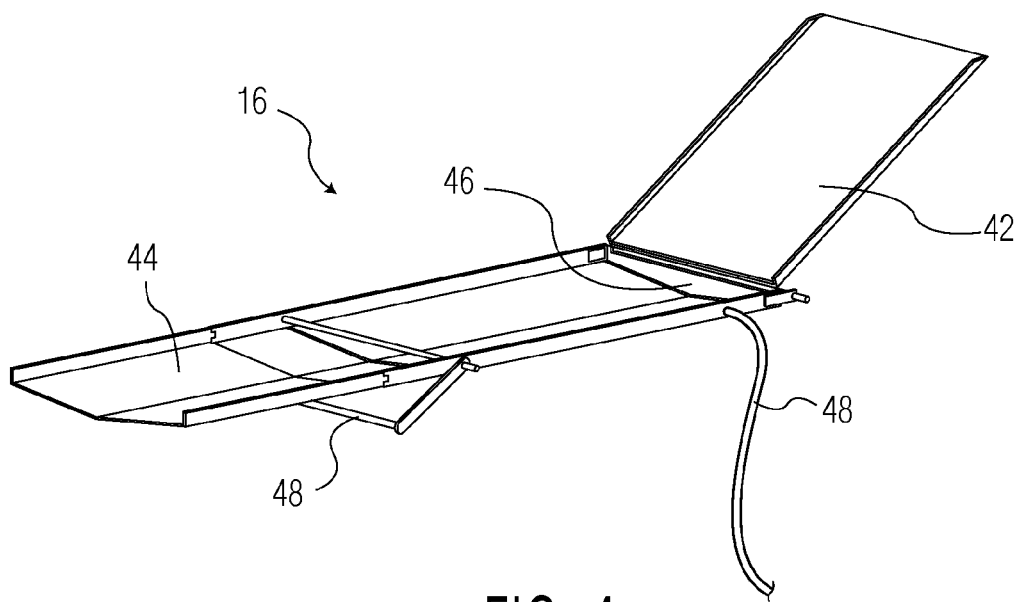
FIG. 4 shows an exemplary waste liquid collector, a so called drip pan.

Turning now to FIG. 4 an exemplary embodiment of the waste liquid collecting drip pan 16 is shown.

A drip pan 16 usable in the disclosure comprises two main parts 42, 44, pivotally connected so as to be foldable. These parts 42, 44 form a respective "waste liquid chute" for collecting waste liquid emanating from the various points on the engine during a washing operation. A first chute, the rear chute 42 below, is adapted to be positioned with its free end, i.e. the end opposite to the end where the two main parts 42, 44 are connected, in front of and in suitably in contact with the droplet separator (although being in contact is not a requirement). This rear chute 42 will receive liquid emanating from bottom of the droplet separator 14, and direct it towards the lowest point of the chute 42 where it is drained off. It will also act as a guide for liquid coming directly from the engine, entrained with the flowing air but missing the separator 14 and splashing against the rear chute 42. Thus, it will act as a "splash stop" preventing liquid to end up at unwanted areas on the working platform.

A second chute 44, referred to as the front chute below, extends away from the rear chute 42 in an unfolded state and is adapted to be located under the engine housing for collecting liquid trickling through the housing and emanating from various holes and recesses in said engine housing.

As can be best seen in FIG. 1, the two waste liquid chutes are positioned so as to be inclined in order to enable water to collect by running down the chutes 42, 44 and down into the region where the chutes 42, 44 are connected. In this region there is suitably provided a drain 46 to which a tubing 48 is coupled and through which the water is conveyed further down to a tank on the ground.

The tubing from the chute and the tubing from the separator can be connected via T-coupling to a common tubing or alternate arrangements.

The rear chute 42 for collecting liquid from the separator has a steeper slope/inclination than the front chute 44 in FIG. 4. This is simply an adaptation to the geometry of the engine.

In order to position the chutes 42, 44 in their inclined positions, various means can be provided. For the first chute 42, in the one exemplary embodiment thereof, it simply rests against the separator 14, as indicated in the figure. However, there may be suitable means for attaching it to the frame 22 of the support 12 or to the separator 14 or both. However, this is not strictly necessary. Instead there could be provided a support strut resting against the floor or against some part of the foot of the support.

The front chute 44 is suitably provided with a separate support member. In the shown embodiment this support comprises a pivotable yoke like device 48, attached to the sides of the chute 44 and extending underneath it. It can be locked in a plurality of different positions causing different inclinations and heights of the chute 44.

In accordance with the disclosure there is also provided a new method of providing a waste liquid separator and collector device. The method comprises, in one example, providing a support structure module, a droplet separator module connectable to said support structure module, and a waste liquid collector module, as individual components. Said modules are located individually at a place of use and then the modules are assembled to an operative unit. The modules may be carried by hand to the place of use, and they can also be transported to the place of use by mechanical means such as by means of a fork lift, a crane or hydraulic apparatus.

The foregoing examples are provided merely for the purpose of explanation and are in no way to be construed as limiting. While reference to various embodiments are shown, the words used herein are words of description and illustration, rather than words of limitation. Further, although reference to particular means, materials, and embodiments are shown, there is no limitation to the particulars disclosed herein. Rather, the embodiments extend to all functionally equivalent structures, methods, and uses, such as are within the scope of the appended claims.

The invention claimed is:

1. A modular waste liquid separator and collector device, comprising the following component modules: a support structure comprising: a frame and a foot structure pivotally coupled to the frame, the foot structure being movable between a first position wherein it is essentially parallel with the frame and a second position in which it is essentially perpendicular to the frame; and a locking and stabilizing device for locking and stabilizing the foot structure and the frame in said essential perpendicular orientation; a droplet separator connectable to said support structure; and a waste liquid chute device; wherein said component modules are individually portable.

2. The device according to claim 1, wherein the support structure and the waste liquid collector are foldable with respect to each other.

3. The device according to claim 1, wherein the frame is essentially rectangular, having two side bars and at least one cross-bar connecting the side bars, and wherein the foot structure comprises two foot bars pivotally coupled between the ends of the respective foot bar, to one end of each of the side bars, and wherein there is provided at least one stabilizing strut connected or connectable to the frame and a foot bar, respectively, so as to lock the frame and foot bar in said essentially perpendicular orientation with respect to each other.

4. The device according to claim 1, wherein the droplet separator comprises a frame having upper and lower frame segments and side segments connecting said upper and lower segments, and droplet separating elements provided in the frame, said droplet separating elements capable of conveying droplets downwards by gravity so as to collect In the lower segment, the droplets being separated from a flow of a mixture of liquid and gas impacting said separating elements during use.

5. The device according to claim 4, wherein said lower frame segment comprises a drain for draining liquid that has collected in the lower frame segment.

6. The device according to claim 5, further comprising tubing coupled to the drain for conveying the waste liquid to a waste liquid reservoir.

7. The device according to claim 1, wherein the waste liquid collector comprises at least two parts, pivotally connected so as to be foldable, a first part adapted to be positioned with its free end adjacent to the front side of the droplet separator, and a second part adapted to extend away from the first part in an unfolded state.

8. The device according to claim 7, wherein the waste liquid collector is connectable to the frame or to the separator or both.

9. A method of providing a waste liquid separator and collector device, comprising
providing a support structure module;
providing a droplet separator module connectable to said support structure module;
providing a waste liquid collector module;
locating said modules individually at a place of use; and
assembling said modules to an operative unit, wherein the support structure module further comprises a frame and a foot structure and the step of locating said modules includes the step of rotating the frame about a pivot axis located on the foot structure.

10. The method according to claim 9, comprising hand carrying said modules to the place of use.

11. The method according to claim 9, comprising transporting said modules to the place of use by mechanical means.

12. The method according to claim 9, further comprising the step of locking the frame in place with respect to the foot structure.

13. A modular waste liquid separator and collector device, comprising the following component modules: a support structure comprising: a separate frame and a foot structure rigidly connectable to each other so as to form a combination comprising an upright frame and a horizontal foot, and a locking and stabilizing device for locking and stabilizing the foot and frame structures in an essentially perpendicular orientation with respect to each other; a droplet separator connectable to said support structure; and a waste liquid chute device; wherein said component modules are individually portable.

14. The device according to claim 13, wherein the support structure and the waste liquid collector are foldable with respect to each other.

15. The device according to claim 13, wherein the frame is essentially rectangular, having two side bars and at least one cross-bar connecting the side bars, and wherein the foot structure comprises two foot bars pivotally coupled between the ends of the respective foot bar, to one end of each of the side bars, and wherein there is provided at least one stabilizing strut connected or connectable to the frame and a foot bar, respectively, so as to lock the frame and foot bar in said essentially perpendicular orientation with respect to each other.

16. The device according to claim 13, wherein the droplet separator comprises a frame having upper and lower frame segments and side segments connecting said upper and lower segments, and droplet separating elements provided in the frame, said droplet separating elements capable of conveying droplets downwards by gravity so as to collect in the lower segment, the droplets being separated from a flow of a mixture of liquid and gas impacting said separating elements during use.

17. The device according to claim 16, wherein said lower frame segment comprises a drain for draining liquid that has collected in the lower frame segment.

18. The device according to claim 17, further comprising tubing coupled to the drain for conveying the waste liquid to a waste liquid reservoir.

19. The device according to claim 13, wherein the waste liquid collector comprises at least two parts, pivotally connected so as to be foldable, a first part adapted to be positioned with its free end adjacent to the front side of the droplet separator, and a second part adapted to extend away from the first part in an unfolded state.

20. The device according to claim 19, wherein the waste liquid collector is connectable to the frame or to the separator or both.

* * * * *